US010406535B2

(12) United States Patent
Ni

(10) Patent No.: US 10,406,535 B2
(45) Date of Patent: Sep. 10, 2019

(54) TWO-STAGE DUST-AIR SEPARATION STRUCTURE AND DUST CUP COMPRISING SAME

(71) Applicant: KINGCLEAN ELECTRIC CO., LTD., Suzhou, Jiangsu (CN)

(72) Inventor: Zugen Ni, Jiangsu (CN)

(73) Assignee: KINGCLEAN ELECTRIC CO., LTD., Jiangsu (CN)

( * ) Notice: Subject to any disclaimer, the term of this patent is extended or adjusted under 35 U.S.C. 154(b) by 139 days.

(21) Appl. No.: 15/544,196

(22) PCT Filed: Nov. 9, 2015

(86) PCT No.: PCT/CN2015/094096
§ 371 (c)(1),
(2) Date: Jul. 17, 2017

(87) PCT Pub. No.: WO2016/119503
PCT Pub. Date: Aug. 4, 2016

(65) Prior Publication Data
US 2017/0361338 A1  Dec. 21, 2017

(30) Foreign Application Priority Data
Jan. 28, 2015  (CN) .......................... 2015 1 0044589

(51) Int. Cl.
*B01D 39/00* (2006.01)
*B04C 5/26* (2006.01)
(Continued)

(52) U.S. Cl.
CPC ................ *B04C 5/26* (2013.01); *A47L 9/127* (2013.01); *A47L 9/16* (2013.01); *A47L 9/165* (2013.01);
(Continued)

(58) Field of Classification Search
CPC ....... B04C 5/26; B04C 9/00; B04C 2009/004; B04C 3/06; B04C 2003/006; B04C 3/04;
(Continued)

(56) References Cited

U.S. PATENT DOCUMENTS 2,654,351 A * 10/1953 Ammon ................ F22B 37/322
122/459
2,936,043 A * 5/1960 Armstrong ................ B04C 5/06
55/416
(Continued)

FOREIGN PATENT DOCUMENTS

CN        2768901 Y    4/2006
CN      201211161 Y    3/2009
(Continued)

OTHER PUBLICATIONS

Extended European Search Report corresponding to Application No. 15879701.9-1018/3251573 PCT/CN2015094096; dated Oct. 10, 2018.
(Continued)

Primary Examiner — Dung H Bui
(74) Attorney, Agent, or Firm — Cantor Colburn LLP

(57) ABSTRACT

A two-stage dust-air separation structure includes a cyclone separator and a spiral dust-air separation device. A first stage separation of dust from air is realized by a cyclone housing, and by arranging a second-stage cyclone barrel 5 inside the cyclone housing and arranging the spiral dust-air separation device at a barrel opening of the second-stage cyclone barrel, the dusty air, after going through the first stage separation, is guided by the spiral dust-air separation device to form, on an inner wall of the second-stage cyclone barrel, an airflow rotating towards the barrel bottom, and the dust in the airflow is driven by a centrifugal force to rotate downwardly to the barrel bottom and be collected in a second-stage dust collecting space, and the air in the rotating
(Continued)

airflow is extracted by the negative pressure, thereby realizing a second stage separation of dust from air.

9 Claims, 11 Drawing Sheets

(51) Int. Cl.
| | |
|---|---|
| *B01D 45/12* | (2006.01) |
| *A47L 9/16* | (2006.01) |
| *A47L 9/12* | (2006.01) |
| *B01D 45/16* | (2006.01) |
| *B04C 9/00* | (2006.01) |
| B04C 3/06 | (2006.01) |
| B04C 3/00 | (2006.01) |
| B04C 3/04 | (2006.01) |

(52) U.S. Cl.
CPC ........... *A47L 9/1608* (2013.01); *A47L 9/1683* (2013.01); *B01D 45/12* (2013.01); *B01D 45/16* (2013.01); *B04C 9/00* (2013.01); *B04C 3/04* (2013.01); *B04C 3/06* (2013.01); *B04C 2003/006* (2013.01); B04C 2009/004 (2013.01)

(58) Field of Classification Search
CPC ...... A47L 9/1608; A47L 9/165; A47L 9/1683; A47L 9/127; A47L 9/16; B01D 45/16; B01D 45/12
See application file for complete search history.

(56) References Cited

U.S. PATENT DOCUMENTS

| | | | | | |
|---|---|---|---|---|---|
| 3,349,548 | A | * | 10/1967 | Boyen | B04C 5/103 210/512.1 |
| 3,425,192 | A | * | 2/1969 | Davis | A47L 9/1625 209/711 |
| 3,590,558 | A | * | 7/1971 | Femandes | B04C 5/103 55/338 |
| 3,769,781 | A | * | 11/1973 | Klein | F22B 37/327 96/372 |
| 3,788,282 | A | * | 1/1974 | Modrak | F22B 37/327 122/34 |
| 4,486,207 | A | * | 12/1984 | Baillie | B01D 45/12 209/718 |
| 5,186,836 | A | * | 2/1993 | Gauthier | B04C 3/00 209/722 |
| 5,229,014 | A | * | 7/1993 | Collins | B04B 5/12 210/512.1 |
| 6,228,151 | B1 | * | 5/2001 | Conrad | A47L 9/1683 55/424 |
| 6,440,197 | B1 | * | 8/2002 | Conrad | A47L 9/1608 55/418 |
| 7,842,113 | B2 | * | 11/2010 | Albrecht | F22B 37/322 55/348 |
| 2005/0011170 | A1 | * | 1/2005 | Christiansen | B01D 45/16 55/345 |
| 2006/0278081 | A1 | * | 12/2006 | Han | A47L 9/1625 96/61 |
| 2007/0209334 | A1 | * | 9/2007 | Conrad | A47L 5/28 55/337 |
| 2007/0295209 | A1 | * | 12/2007 | Strauser | B01D 45/16 95/271 |
| 2009/0031525 | A1 | * | 2/2009 | Makarov | A47L 9/1625 15/347 |
| 2009/0199359 | A1 | * | 8/2009 | Hyun | A47L 9/1608 15/347 |
| 2009/0205298 | A1 | * | 8/2009 | Hyun | A47L 9/1616 55/343 |
| 2009/0282791 | A1 | * | 11/2009 | Lang | A47L 9/1608 55/326 |
| 2011/0203234 | A1 | * | 8/2011 | Wolsfeld | B01D 45/08 55/307 |
| 2012/0233971 | A1 | | 9/2012 | Kim | |
| 2013/0199137 | A1 | * | 8/2013 | Hallgren | B01D 45/16 55/393 |
| 2014/0165513 | A1 | * | 6/2014 | Oelpke | F02M 35/0216 55/385.1 |
| 2015/0068169 | A1 | * | 3/2015 | Schulz | B01D 45/16 55/337 |
| 2015/0151231 | A1 | * | 6/2015 | Loh | B04C 5/06 95/271 |
| 2015/0265112 | A1 | * | 9/2015 | Chen | A47L 9/1666 15/347 |
| 2015/0273484 | A1 | * | 10/2015 | Ho | B01D 45/16 55/321 |

FOREIGN PATENT DOCUMENTS

| | | |
|---|---|---|
| CN | 201219871 Y | 4/2009 |
| CN | 201365881 Y | 12/2009 |
| CN | 201453152 U | 5/2010 |
| CN | 203263296 U | 11/2013 |
| CN | 103622642 A | 3/2014 |
| CN | 104545695 A | 4/2015 |
| CN | 104644057 A | 5/2015 |
| CN | 20447938 U | 7/2015 |
| EP | 2508265 A1 | 10/2012 |
| KR | 20140136591 A | 12/2014 |

OTHER PUBLICATIONS

International Search Report corresponding to Application No. PCT/CN2015/094096; dated Jan. 26, 2016.

* cited by examiner

TWO-STAGE DUST-AIR SEPARATION STRUCTURE AND DUST CUP COMPRISING SAME

This application is the national phase of International Application No. PCT/CN2015/094096, titled "TWO-STAGE DUST-AIR SEPARATION STRUCTURE AND DUST CUP COMPRISING SAME", filed on Nov. 9, 2015, which claims the benefit of priority to Chinese Patent Application No. 201510044589.X, titled "TWO-STAGE DUST-GAS SEPARATION STRUCTURE AND DUST CUP HAVING SAME", filed with the State Intellectual Property Office of People's Republic of China on Jan. 28, 2015, the entire disclosures of which are incorporated herein by reference.

FIELD

The present application relates to the field of manufacturing technology of dust collectors, and in particular to a two-stage dust-air separation structure and a dust cup having the structure.

BACKGROUND

A dust collector is a cleaning appliance which utilizes a motor to drive vanes to rotate at a high speed to generate an air negative pressure in a sealed housing, so as to suction dust into a dust collecting device and discharge the filtered air out of a fan at an extremely high speed. The dust collectors are classified into dry type dust collectors and wet-dry type dust collectors according their functions. The dry type dust collectors generally include a dust-bag type dust collector and a dust-cup type dust collector.

A conventional dust-cup type dust collector generally includes a two-stage dust-air separation structure. A first-stage structure is used to filter large size dirt in air, and a second-stage structure is used to separate and collect small size debris such as dust particles. In a conventional two-stage dust-air separation structure, a two-stage cyclone is generally generated by the cooperation between a cover plate of a dust cup filter and a cyclone body having multiple cyclone openings, and this structure requires a lot of components, which also requires many and complicated molds and assembly processes. Further, the sealing of each link is difficult to control, and air leakage and dust leakage phenomena are apt to occur, which adversely affects the comprehensive performance of the whole machine.

A conventional two-stage dust-air separation type dust cup structure is arranged axially, in which multiple layers of cone bodies and a cyclone partition plate are axially stacked to achieve an object of separating dust from the gas, thus its filter structure occupies a large proportion of space of the dust cup and occupies too much of the dust-collecting volume of the dust cup, and a dust storage space is limited. Moreover, this two-stage dust-air separation type dust cup structure requires the dust cup to have a relatively high size and a relatively large volume, and is not applicable to a mini dust collector and a portable dust collector, and the application scope thereof is limited.

In view of the above issues, it is necessary to provide a novel two-stage dust-air separation structure to reduce the number of the components, simplify the assembly process, improve the comprehensive performance of the whole machine, and also effectively reduce the space of the dust cup that is occupied by the two-stage dust-air separation structure, to realize the maximum dust storage volume and improve the dust collecting efficiency, thereby allowing the two-stage dust-air separation structure to be applicable to dust collectors of various types and sizes.

SUMMARY

In view of this, a two-stage dust-air separation structure and a dust cup having the structure are provided according to the present application, to reduce the number of the components, simplify the assembly process, improve the comprehensive performance of the whole machine, and also effectively reduce the space of the dust cup that is occupied by the two-stage dust-air separation structure, to realize the maximum dust storage volume and improve the dust collecting efficiency, thereby allowing the two-stage dust-air separation structure to be applicable to dust collectors of various types and sizes.

A two-stage dust-air separation structure provided according to an object of the present application includes a cyclone separator and a spiral dust-air separation device; the cyclone separator includes a cyclone housing for a first stage dust-air separation and a second-stage cyclone barrel arranged inside the cyclone housing, a gap is provided between the second-stage cyclone barrel and an inner wall of the cyclone housing, and the gap is configured to form an air-intake duct for introducing dusty air after going through the first stage dust-air separation, and the spiral dust-air separation device is arranged at a barrel opening of the second-stage cyclone barrel, an opening connected to a second-stage dust collecting space is further provided at a barrel bottom of the second-stage cyclone barrel, and after the dusty air has gone through the first stage dust-air separation performed by the cyclone housing, at least part of the dusty air is guided by the air-intake duct to the spiral dust-air separation device and is guided by the spiral dust-air separation device to form, on an inner wall of the second-stage cyclone barrel, an airflow rotating towards the barrel bottom; and dust in the airflow is driven by a centrifugal force to rotate downwardly to the barrel bottom and be collected in the second-stage dust collecting space, and air in the rotating airflow is extracted by a negative pressure, to realize a second stage dust-air separation.

Preferably, the spiral dust-air separation device includes a spiral impeller configured to generate a second-stage cyclone, the spiral impeller has a plurality of downward-inclined vanes, and the vanes are configured to constrain the dusty air to flow obliquely downwards.

Preferably, the spiral dust-air separation device further includes an inner ring arranged on an inner periphery of the spiral impeller, a plurality of guidance tangent planes are arranged on a side wall, corresponding to an air outlet of the spiral impeller, of the inner ring; and the plurality of guidance tangent planes are configured to constrain the dusty air to flow to an outer periphery of the spiral impeller to begin to form a rotating state.

Preferably, a wall of the inner ring of the spiral impeller extends downwards to form a wind shielding plate.

Preferably, the cyclone separator further includes an inverted dust retaining barrel arranged inside the second-stage cyclone barrel, a gap is provided between the dust retaining barrel and the second-stage cyclone barrel, and the gap is configured to form a second-stage dust-air separation duct, and an inner side wall of the dust retaining barrel is configured to constrain the dusty air to rotate in the dust retaining barrel to generate a centrifugal force to resist a suction of the negative pressure.

Preferably, a lower part of the second-stage cyclone barrel extends obliquely to a center of the barrel bottom of the second-stage cyclone barrel to form a conical hole, to allow the dust to fall into the second-stage dust collecting space under the guidance of the conical hole.

Preferably, a gap is provided between a bottom of the dust retaining barrel and the conical hole, and the bottom of the dust retaining barrel and the conical hole are fixedly connected by a plurality of strip ribs to allow the dust to stop rotating at the strip ribs, a space between the gap and the strip ribs forms a second-stage dust inlet, and the dust after going through the second stage dust-air separation falls into the second-stage dust collecting space via the second-stage dust inlet.

Preferably, the second-stage dust collecting space is configured as a second-stage dust collecting barrel arranged below the second-stage cyclone barrel, the conical hole extends to the second-stage dust collecting barrel and partially extends into an inside of the second-stage dust collecting barrel to form a dust retaining flange of the second-stage dust collecting barrel.

A dust cup is provided, which includes a cup body and the two-stage dust-air separation structure arranged inside the cup body, a space between the cup body and the two-stage dust-air separation structure forms a first-stage dust collecting barrel, an air inlet and an air outlet are arranged in a sidewall of the cup body, dusty air is guided by the air inlet to the cyclone separator of the two-stage dust-air separation structure, and after the dusty air has gone through a first stage dust-air separation performed by the cyclone housing, at least part of the dusty air enters the second-stage cyclone barrel through the cyclone housing to proceed to a second stage dust-air separation.

Preferably, an overall air-intake area of the spiral impeller is less than an air-outgoing area of the dust cup, to allow a centrifugal force generated by rotation to be sufficient to resist a suction of the negative pressure.

Preferably, a partition plate is arranged inside the cup body, a center of the partition plate extends downward to form an opening, a return-air dust guard is arranged on the opening and above the spiral impeller, the return-air dust guard is fixedly connected to an edge of the opening by a plurality of cyclone ribs arranged on a periphery of the return-air dust guard, and the air after going through the second stage dust-air separation is extracted by the negative pressure via gaps between the cyclone ribs.

Preferably, a central part of the return-air dust guard protrudes upward to form an air guiding cone for guiding return air.

Compared with the conventional technology, the two-stage dust-air separation structure and a dust cup having the structure according to the present application have the following advantages.

The structure includes a cyclone separator and a spiral dust-air separation device. A first stage separation of dust from air is realized by a cyclone housing, and by arranging a second-stage cyclone barrel inside the cyclone housing and arranging the spiral dust-air separation device at a barrel opening of the second-stage cyclone barrel, the dusty air, after going through the first stage separation, is guided by the spiral dust-air separation device to form, on an inner wall of the second-stage cyclone barrel, an airflow rotating towards the barrel bottom, and the dust in the airflow is driven by a centrifugal force to rotate downwardly to the barrel bottom and be collected in a second-stage dust collecting space, and the air in the rotating airflow is extracted by a negative pressure, thereby realizing a second stage separation of dust from air. The two-stage dust-air separation structure only includes the cyclone housing, the second-stage cyclone and the spiral dust-air separation device, hence, the number of components is effectively reduced, and the assembly process is simplified, which facilitates the improvement of the comprehensive performance of the whole machine. Moreover, the structure has a small volume, thus can effectively reduce the space of the dust cup that is occupied by the two separation structure, realize the maximum dust storage volume and improve the dust collecting efficiency, and is applicable to dust collectors of various types and sizes.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

Figure 1:
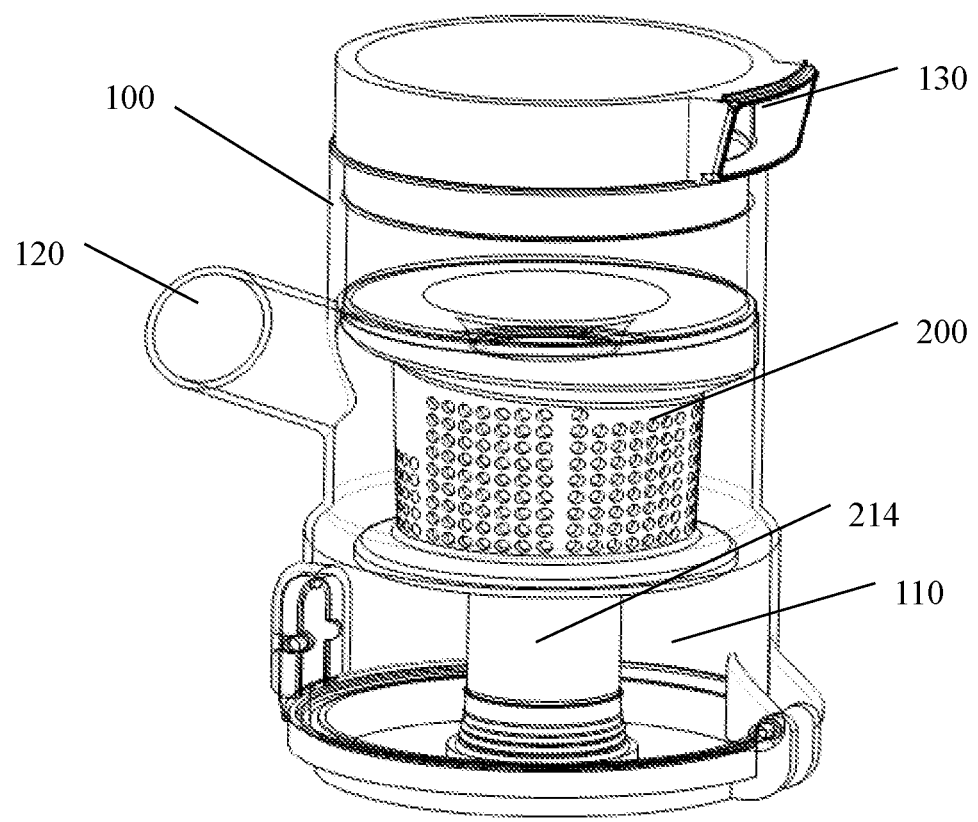
FIG. 1 is a perspective view of a dust cup.

The names of corresponding components denoted by the reference numerals or letters in the drawings:

| | | | |
|---|---|---|---|
| 100 | cup body, | 200 | two-stage dust-air separation structure, |
| 300 | upper cover, | | |
| 500 | base, | 400 | sealing ring, |
| 120 | air inlet, | 110 | first-stage dust collecting barrel, |
| 140 | partition plate, | | |
| 160 | return-air dust guard, | 130 | air outlet, |
| 180 | air guiding cone, | 150 | opening, |
| 111 | filter cotton, | 170 | cyclone rib, |
| 220 | spiral dust-air separation device, | 190 | crimping, |
| 212 | second-stage cyclone barrel, | 210 | cyclone separator, |
| 214 | second-stage dust collecting barrel, | 211 | cyclone housing, |
| 216 | second-stage dust-air separation duct, | 213 | air-intake duct, |
| | | 215 | dust retaining barrel, |
| 218 | strip rib, | 217 | conical hole, |
| 230 | filter hole, | 219 | dust retaining flange, |
| 232 | spiral groove, | 231 | second-stage dust inlet, |
| 222 | inner ring, | 221 | spiral impeller, |
| 224 | guidance tangent plane, | 223 | outer ring, |
| | | 225 | wind shielding plate. |

DETAILED DESCRIPTION OF THE EMBODIMENTS

A conventional two-stage dust-air separation structure requires a lot of components, and relatively many and complicated molds and assembly processes, and the sealing of each of link is difficult to control, thus air leakage and dust leakage phenomena are apt to occur, which adversely affects the comprehensive performance of the whole machine. In addition, a conventional two-stage dust-air separation type dust cup structure is axially arranged, and its filter structure occupies a large portion of the space of the dust cup and occupies too much of the dust collecting volume of the dust cup, and a dust storage space is limited. Moreover, this two-stage dust-air separation dust cup structure requires the dust cup to have a relatively high size and a relatively large volume, thus is not applicable to a mini dust collector and a portable dust collector, and the application scope thereof is limited.

In view of the deficiencies in the conventional technology, a two-stage dust-air separation structure and a dust cup having the structure are provided according to the present application, to reduce the number of the components, simplify the assembly process, improve the comprehensive performance of the whole machine, and also effectively reduce the space of the dust cup that is occupied by the two-stage separation structure, to realize the maximum dust storage volume and improve the dust collecting efficiency, thereby allowing the two-stage dust-air separation structure to be applicable to dust collectors of various types and sizes.

Technical solutions of the present application are described clearly and completely with reference to embodiments hereinafter. Apparently, the described embodiments are only a few rather than all of the embodiments of the present application. Other embodiments obtained by the person skilled in the art without any creative efforts based on the embodiments of the present application fall into the scope of the present application.

Figure 3:
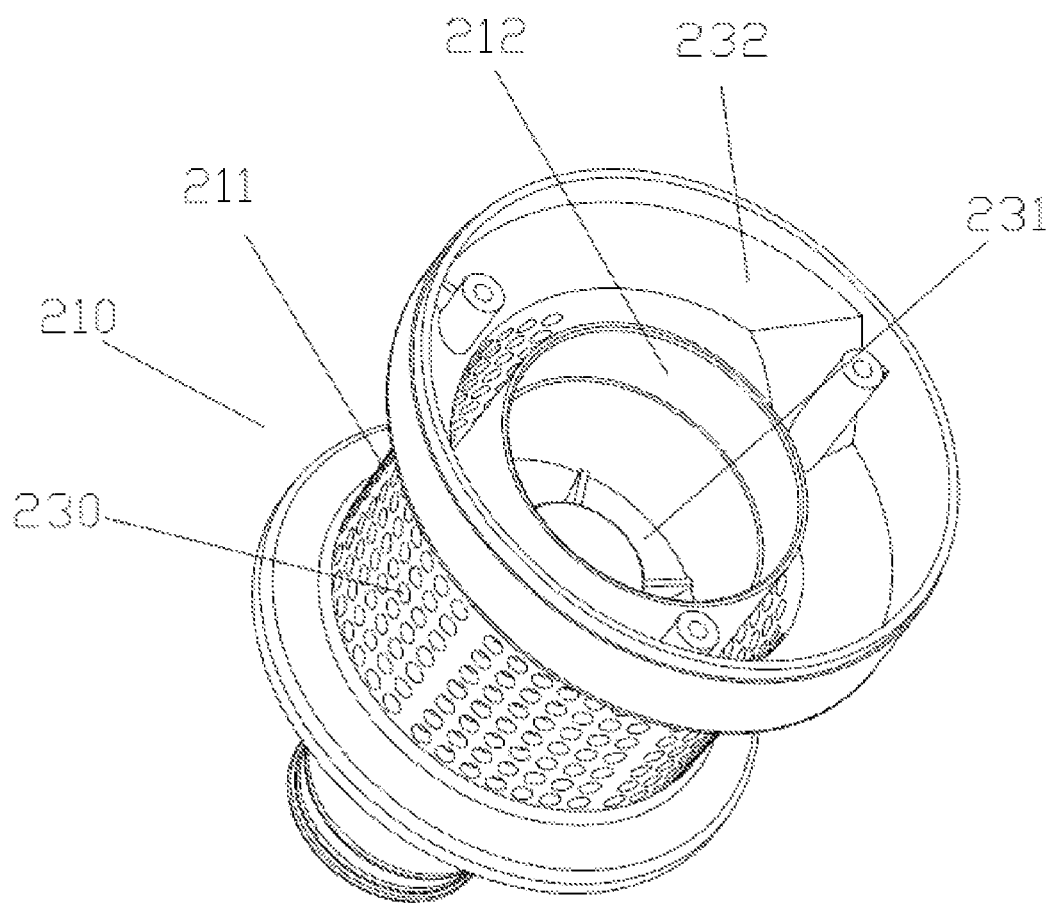
FIG. 3 is a first schematic view showing the structure of a cyclone separator.
Figure 4:
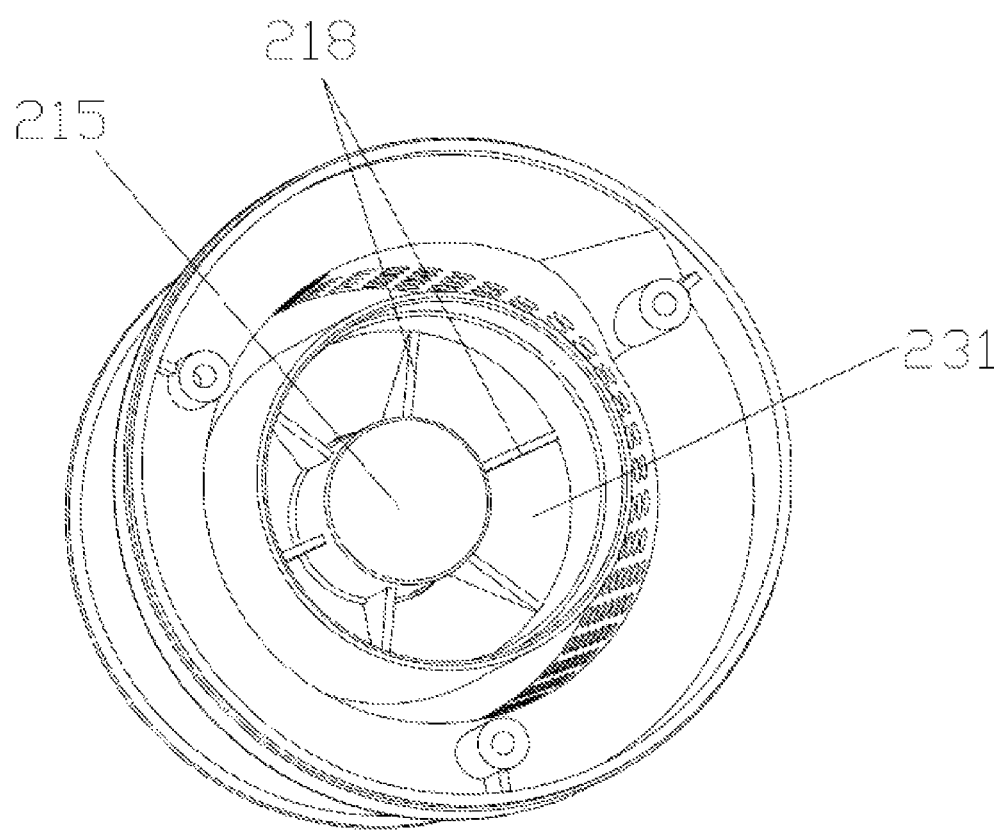
FIG. 4 is a second schematic view showing the structure of the cyclone separator.
Figure 5:
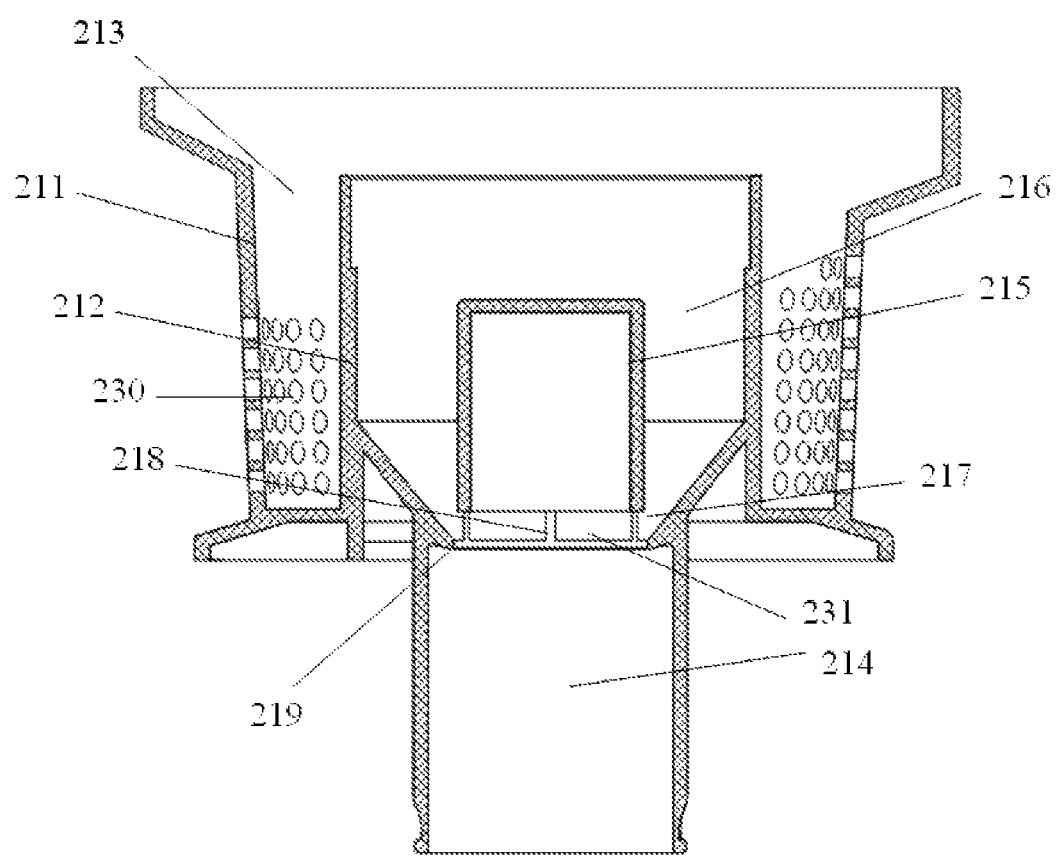
FIG. 5 is a sectional view of the cyclone separator.
Figure 6:
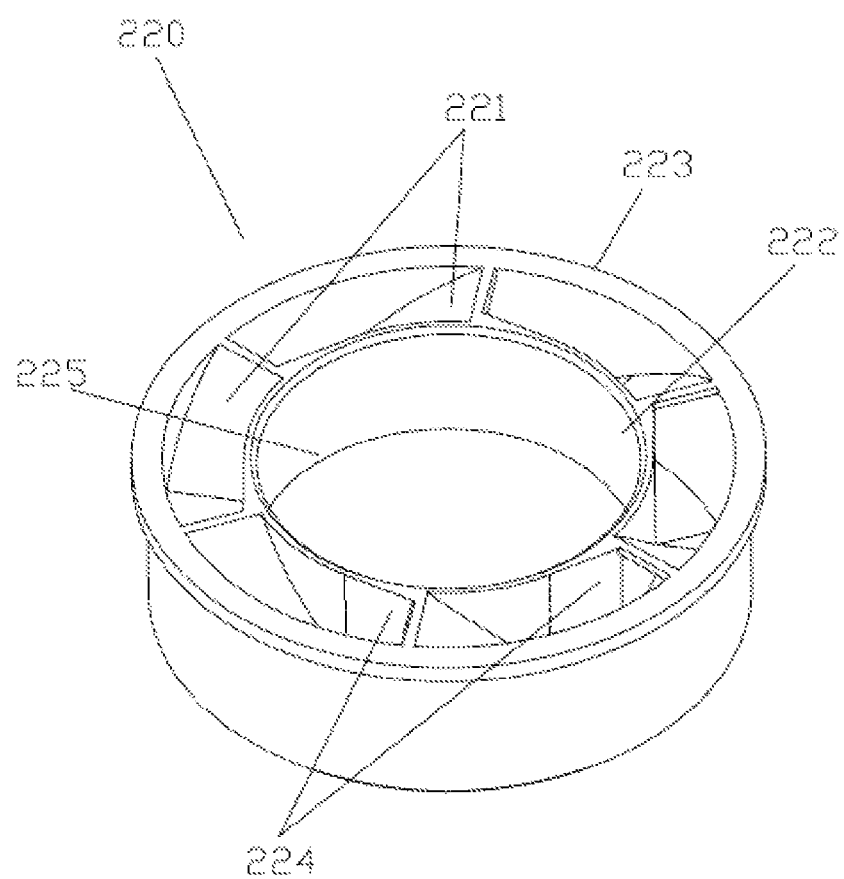
FIG. 6 is a schematic view showing the structure of a spiral dust-air separation device.
Figure 7:
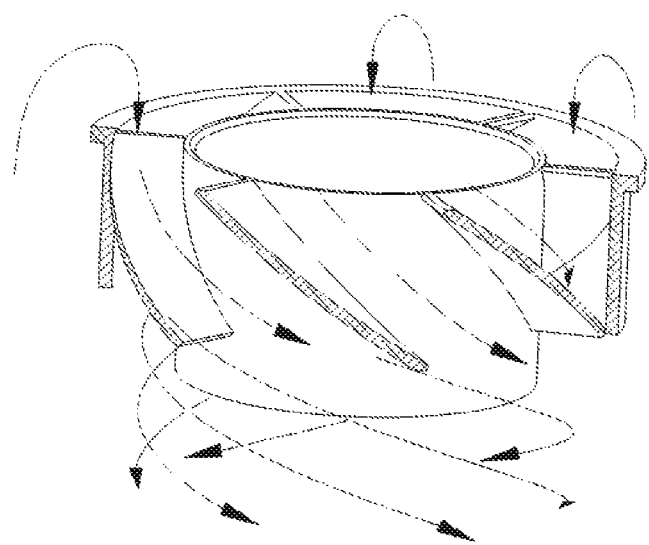
FIG. 7 is a schematic view showing flowing directions of airflow of the spiral dust-air separation device.
Figure 8:
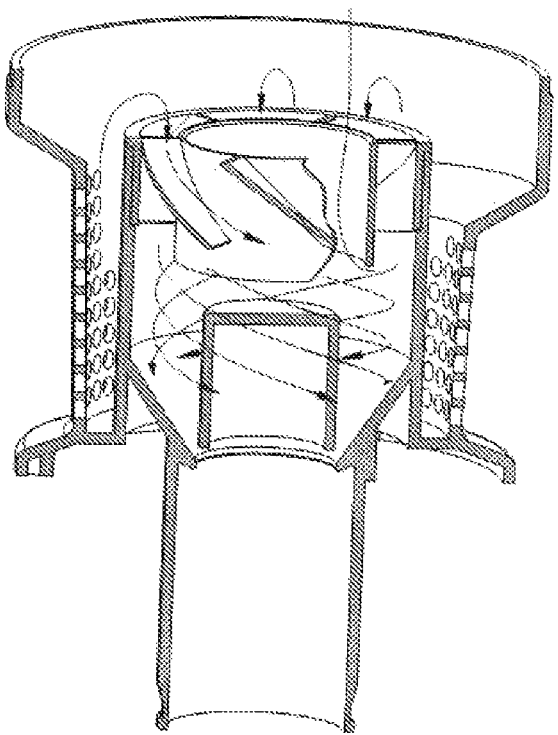
FIG. 8 is a schematic view showing a two-stage dust-air separation.

Referring to FIGS. 3 to 8, a two-stage dust-air separation structure is provided, which includes a cyclone separator 210 and a spiral dust-air separation device 220. The cyclone separator 210 includes a cyclone housing 211 for a first stage dust-air separation and a second-stage cyclone barrel 212 arranged inside the cyclone housing 211. A gap is provided between the second-stage cyclone barrel and an inner wall of the cyclone housing, and the gap is configured to form an air-intake duct 213 for introducing the gas after being separated in the first stage dust-air separation. Filter holes 230 are arranged in the cyclone housing, and after entering from an air inlet, the dusty air firstly passes through the filter holes 230 to allow large sized debris to be removed and collected in a first stage collecting barrel 110, and the air after going through the first stage separation enters the air-intake duct 213.

A spiral groove 232 is arranged in an inner side of an upper end of the cyclone housing, such that airflow rotates there and generates a centrifugal force to facilitate airflow's rotating downwards and entering the spiral dust-air separation device.

The spiral dust-air separation device 220 is arranged at a barrel opening of the second-stage cyclone barrel 212, and an opening connected to a second-stage dust collecting space is further provided at a barrel bottom of the second-stage cyclone barrel 212, and the second-stage dust collecting space is a second-stage dust collecting barrel 214. After the dusty air has gone through the first stage dust-air separation performed by the cyclone housing 211, at least part of the dusty air is guided to the spiral dust-air separation device 220 through the air-intake duct 213, and is guided by the spiral dust-air separation device to form, on an inner wall of the second-stage cyclone barrel 212, an airflow rotating towards the barrel bottom, the dust in the airflow is driven by the centrifugal force to rotate downwardly to the barrel bottom and be collected in the second-stage dust collecting barrel 214, and the air in the rotating airflow is extracted by a negative pressure, thereby realizing the second stage dust-air separation.

The spiral dust-air separation device 220 includes a spiral impeller 221 configured to generate a second-stage cyclone. The spiral impeller 221 has multiple downward-inclined vanes, and the vanes can constrain the dusty air to flow obliquely downwards to form a spiral airflow.

The spiral dust-air separation device 220 further includes an inner ring 222 arranged on an inner periphery of the spiral impeller 221. Several guidance tangent planes are arranged on a side wall, corresponding to an air outlet of the spiral impeller 221, of the inner ring 22. The guidance tangent planes can constrain the dusty air to flow to an outer periphery of the spiral impeller to begin to form a rotating state. An outer ring is arranged at an outer periphery of the spiral impeller. The airflow is guided by the inner ring and the outer ring, which improves the structural strength and stability of the spiral impeller. A wall of the inner ring of the spiral impeller may extend downwards to form a wind shielding plate 225.

The cyclone separator 210 further includes an inverted dust retaining barrel 215 arranged inside the second-stage cyclone barrel 212, a gap is provided between the dust retaining barrel and the second-stage cyclone barrel, and the gap is configured to form a second-stage dust-air separation duct 216. The dusty air rotates spirally in the second-stage dust-air separation duct to generate a centrifugal force, to enable the dust to fall down along the inner wall of the second-stage cyclone barrel. An inner side wall of the dust retaining barrel is configured to constrain the dusty air to rotate in the dust retaining barrel to generate a centrifugal force to resist suction of the negative pressure, thereby realizing an effective separation of dust from air.

A lower part of the second-stage cyclone barrel extends obliquely to the center of the bottom to form a conical hole 217, to enable the dust to fall into the second-stage dust collecting barrel under the guidance of the conical hole.

A gap is provided between a bottom of the dust retaining barrel 215 and the conical hole 217, and the bottom of the dust retaining barrel 215 and the conical hole are fixedly connected by multiple strip ribs 218 to enable the dust to stop rotating at the strip ribs, and facilitate the dust's falling down. The space between the gap and the strip ribs forms a second-stage dust inlet 231, and the dust after going through the second stage dust-air separation falls into the second-stage dust collecting space via the second-stage dust inlet. The number of the strip ribs uniformly arranged surrounding the dust retaining barrel may be one, two, three or more, and the specific number is not limited.

The conical hole 217 extends to the second-stage dust collecting barrel 214 and partially extends into the inside of the second-stage dust collecting barrel to form a dust retaining flange 219 of the second-stage dust collecting barrel, to prevent the dust from flowing back. The dust retaining flange may generally be designed to extend to a position within an inner side of a projection of the dust retaining barrel, to ensure the effectiveness of dust retaining, and the specific extended position is not limited.

The cyclone separator and the spiral dust-air separation device may both have an integrally formed structure. After being formed, the spiral dust-air separation device is directly mounted at the center of the cyclone separator and the assembly is just completed. The specific forming manner is not limited.

In addition, the two-stage dust-air separation structure may also be integrally formed, and the specific forming and assembling manner is not limited.

Figure 2:
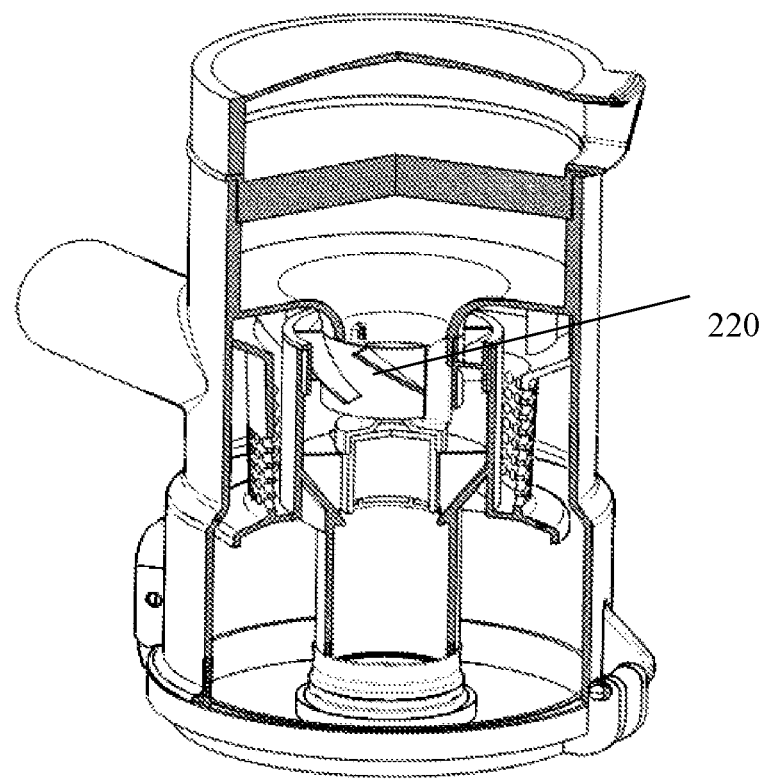
FIG. 2 is a view showing an internal structure of the dust cup.
Figure 9:
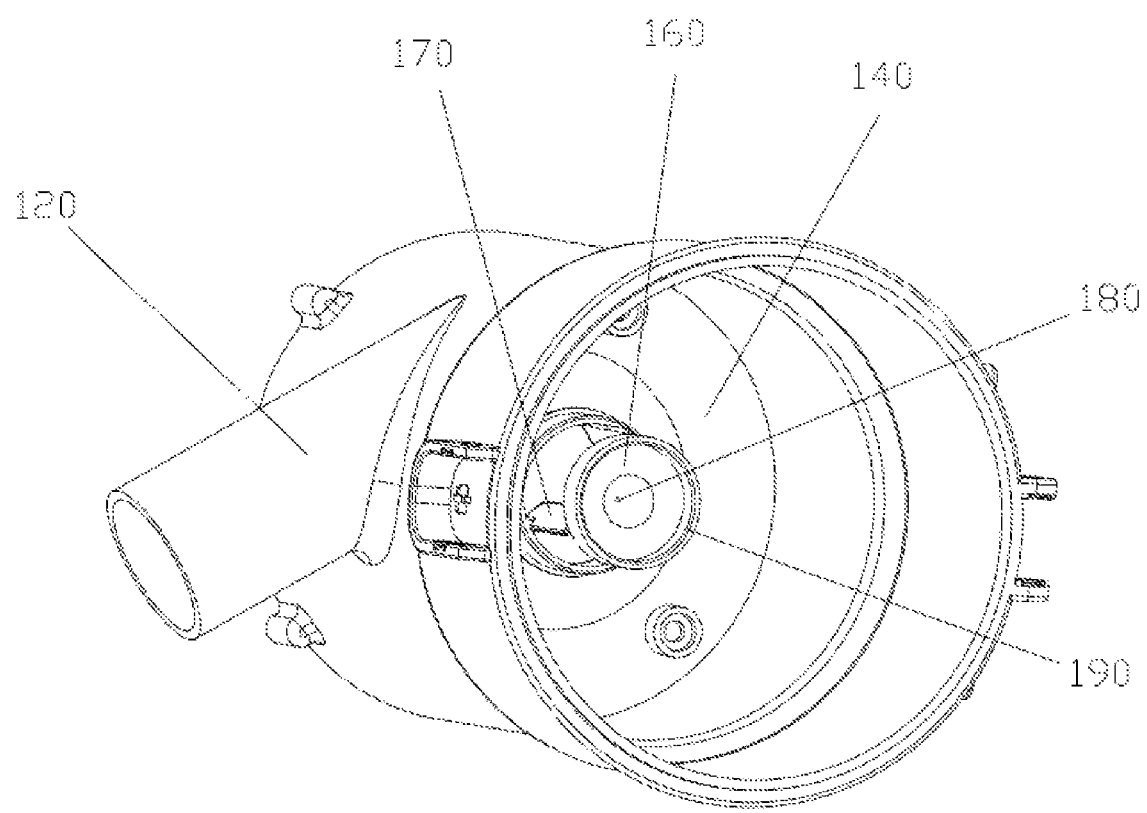
FIG. 9 is a schematic view of a cup body.
Figure 10:
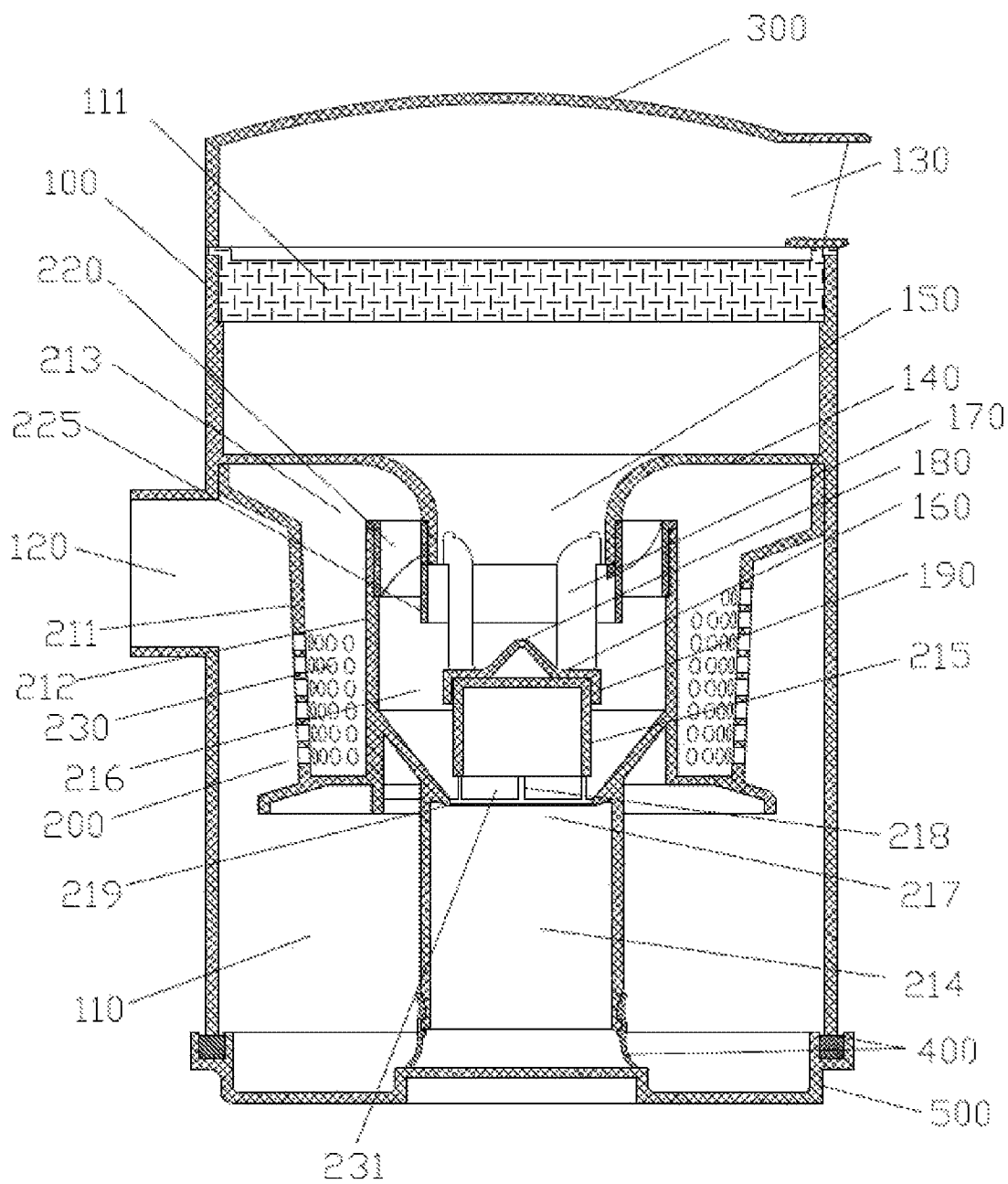
FIG. 10 is a sectional view of the dust cup.
Figure 11:
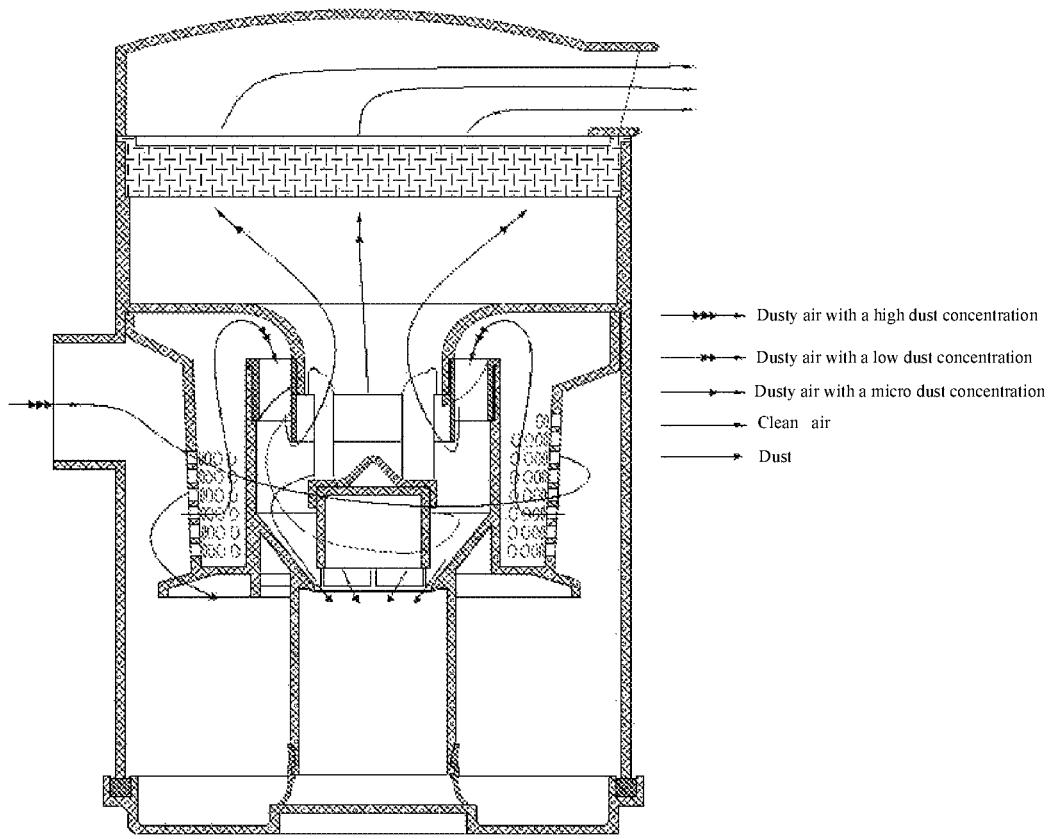
FIG. 11 is a view showing flowing directions of airflow in the dust cup.
Figure 12:
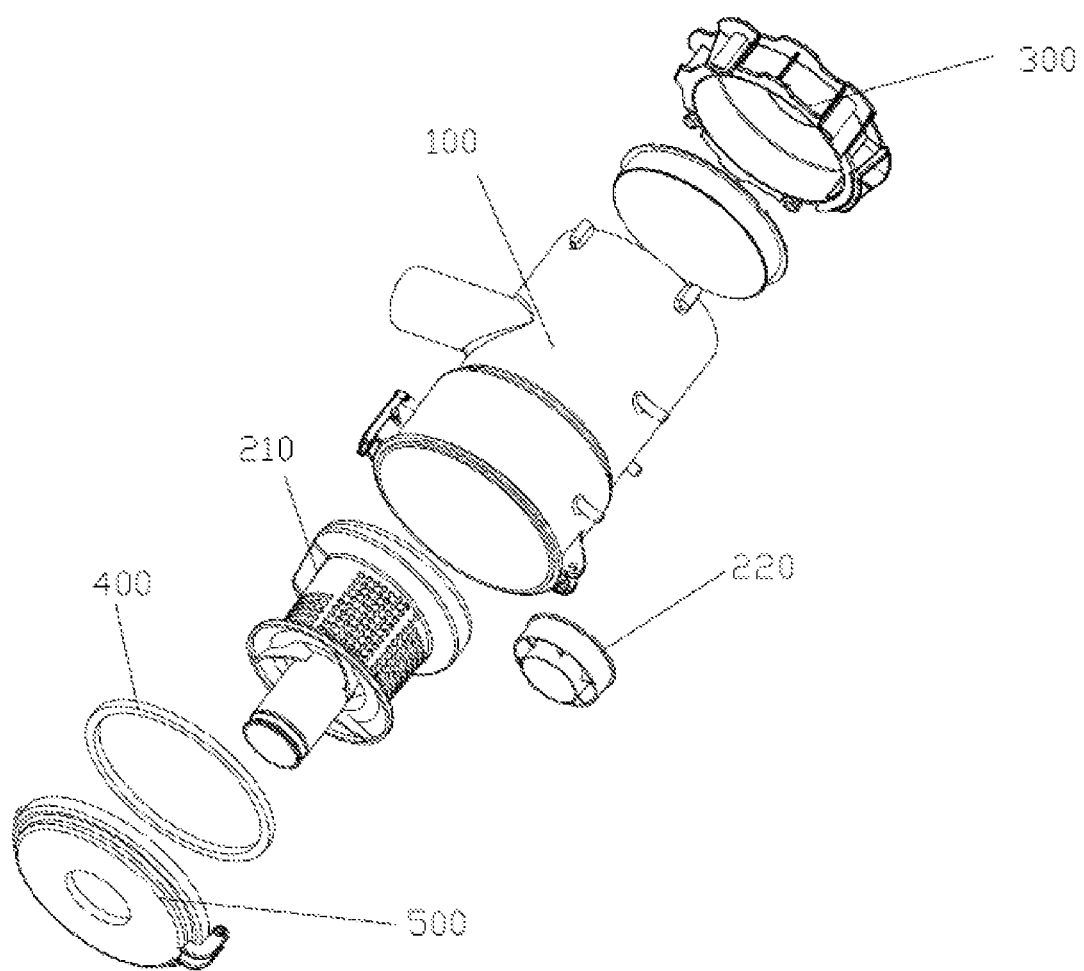
FIG. 12 is an exploded view of the dust cup.

Referring to FIGS. 1 and 2 and FIGS. 9 to 12, a dust cup is provided, which includes a cup body 100 and a two-stage dust-air separation structure 200 arranged inside the cup body 100. A space between the cup body and the two-stage dust-air separation structure forms a first-stage dust collecting barrel 110 for collecting large sized debris. An air inlet 120 and an air outlet 130 are arranged in a sidewall of the cup body, dusty air is guided by the air inlet to the cyclone separator of the two-stage dust-air separation structure, and after the dusty air has gone through a first stage dust-air separation performed by a cyclone housing 211, at least part of the dusty air enters the second-stage cyclone barrel 212 through the cyclone housing, to proceed to a second stage dust-air separation.

An overall air-intake area of the spiral impeller is less than an air-outgoing area of the dust cup, to enable the dusty air to have a higher rotation speed in the case that the volume of air is constant, to resist the suction of the negative pressure.

A partition plate 140 is arranged inside the cup body, a center of the partition plate extends downward to form an opening 150. A return-air dust guard 160 is provided on the opening and above the spiral impeller, the return-air dust guard is fixedly connected to an edge of the opening by several cyclone ribs 170 arranged on a periphery of the return-air dust guard, and the air gone through the second stage dust-air separation is extracted by a negative pressure through gaps between the cyclone ribs. By providing the partition plate to shield an upper end of the cyclone housing, the dusty air after being filtered by the cyclone housing may be guided from an upper end of the air-intake duct into the spiral dust-air separation device, to realize guidance to the ingoing air. A central part of the partition plate has a downward-inclined curved structure, to facilitate guiding the movement of the dusty air.

A central part of the return-air dust guard 160 protrudes upward to form an air guiding cone 180 to realize guidance to the return air. With the cooperation between the cyclone ribs and the air guiding cone, the dusty air gone through the second stage separation still keeps a high-speed rotating state when passing through the return-air dust guard.

A bottom of the return-air dust guard has a crimping to achieve quick assembling of the return-air dust guard with the dust retaining barrel and realize effective centering.

A two-stage dust-air separation structure and a dust cup having the structure are provided according to the present application, and the structure includes a cyclone separator and a spiral dust-air separation device. A first stage separation of dust from air is realized by a cyclone housing, and by arranging a second-stage cyclone barrel inside the cyclone housing and arranging the spiral dust-air separation device at a barrel opening of the second-stage cyclone barrel, the dusty air, after going through the first stage separation, is guided by the spiral dust-air separation device to form, on an inner wall of the second-stage cyclone barrel, an airflow rotating towards the barrel bottom, and the dust in the airflow is driven by a centrifugal force to rotate downwardly to the barrel bottom and be collected in a second-stage dust collecting space, and the air in the rotating airflow is extracted by the negative pressure, thereby realizing a second stage separation of dust from air. The two-stage dust-air separation structure only includes the cyclone housing, the second-stage cyclone and the spiral dust-air separation device, hence, the number of components is effectively reduced, and the assembly process is simplified, which facilitates the improvement of the comprehensive performance of the whole machine. Moreover, the structure has a small volume, thus can effectively reduce the space of the dust cup that is occupied by the two separation structure, realize the maximum dust storage volume and improve the dust collecting efficiency, and is applicable to dust collectors of various types and sizes.

The description of the embodiments herein enables the person skilled in the art to implement or use the present application. Various modifications to the embodiments are apparent to the person skilled in the art, and the general principle defined herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A dust cup, comprising a cup body and a two-stage dust-air separation structure arranged inside the cup body, an air inlet and an air outlet are arranged in a sidewall of the cup body, wherein the two-stage dust-air separation structure comprises a cyclone separator and a spiral dust-air separation device, wherein the cyclone separator comprises a cyclone housing for a first stage dust-air separation and a second-stage cyclone barrel arranged inside the cyclone housing, a space between the cup body and the cyclone housing of the two-stage dust-air separation structure forms a first-stage dust collecting barrel, a gap is provided between the second-stage cyclone barrel and an inner wall of the cyclone housing, and the gap is configured to form an air-intake duct for introducing dusty air after going through the first stage dust-air separation;

the spiral dust-air separation device is arranged at a barrel opening of the second-stage cyclone barrel and comprises a spiral impeller configured to generate a second-stage cyclone, an opening connected to a second-stage dust collecting space is further provided at a barrel bottom of the second-stage cyclone barrel;

a partition plate is arranged inside the cup body, a center of the partition plate extends downward to form an opening, a return-air dust guard is arranged on the extended opening and above the spiral impeller, the return-air dust guard is fixedly connected to an edge of the opening by a plurality of cyclone ribs arranged on a periphery of the return-air dust guard, such that the air after going through the second stage dust-air separation is extracted by the negative pressure via gaps between the cyclone ribs, to realize a second stage dust-air separation;

wherein, the cyclone separator further comprises:

an inverted dust retaining barrel arranged inside the second-stage cyclone barrel, a gap is provided between the dust retaining barrel and the second-stage cyclone barrel, and the gap is configured to form a second-stage dust-air separation duct.

2. The dust cup according to claim 1, wherein the spiral impeller has a plurality of downward-included vanes, and the vanes are configured to constrain the dusty air to flow obliquely downwards.

3. The dust cup according to claim 2, wherein the spiral dust-air separation device further comprises an inner ring arranged on an inner periphery of the spiral impeller, a plurality of guidance tangent planes are arranged on a side wall, corresponding to an air outlet of the spiral impeller of the inner, of the inner ring to constrain the dusty air to flow to an outer periphery of the spiral impeller to begin to form a rotating state.

4. The dust cup according to claim 2, wherein a wall of the inner ring of the spiral impeller extends downwards to form a wind shielding plate.

5. The dust cup according to claim 1, wherein a lower part of the second-stage cyclone barrel extends obliquely to a center of the barrel bottom of the second-stage cyclone barrel to form a conical hole.

6. The dust cup according to claim 5, wherein a gap is provided between a bottom of the dust retaining barrel and the conical hole are fixedly connected by a plurality of strip ribs to allow the dust to stop rotating at the strip ribs, a space between the gap and the strip ribs forms a second-stage dust inlet.

7. The dust cup according to claim 5, wherein the second-stage dust collecting space is configured as a second-stage dust collecting barrel arranged below the second-stage cyclone barrel, the conical hole extends to the second stage dust collecting barrel and partially extends into an inside of the second-stage dust collecting barrel to form a dust retaining flange of the second-stage dust collecting barrel.

8. The dust cup according to claim 1, wherein an overall air-intake area of the spiral impeller is less than an air-outgoing area of the dust cup, to allow a centrifugal force generated by rotation to be sufficient to resist a suction of the negative pressure.

9. The dust cup according to claim 1, wherein a central part of the return-air dust guard protrudes upward to form an air guiding cone for guiding return air.

* * * * *